(12) United States Patent
Shim et al.

(10) Patent No.: US 11,307,673 B2
(45) Date of Patent: Apr. 19, 2022

(54) ELECTRONIC DEVICE COMPRISING KEYBOARD COVER

(71) Applicant: Samsung Electronics Co., Ltd., Gyeonggi-do (KR)

(72) Inventors: Woo-Jung Shim, Gyeonggi-do (KR); Hwan-Myung Noh, Gyeonggi-do (KR); Seung-Woon Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 500 days.

(21) Appl. No.: 16/330,136

(22) PCT Filed: Sep. 5, 2017

(86) PCT No.: PCT/KR2017/009701
§ 371 (c)(1),
(2) Date: Mar. 4, 2019

(87) PCT Pub. No.: WO2018/044139
PCT Pub. Date: Mar. 8, 2018

(65) Prior Publication Data
US 2021/0286440 A1    Sep. 16, 2021

(30) Foreign Application Priority Data

Sep. 5, 2016  (KR) .................... 10-2016-0114012

(51) Int. Cl.
*G06F 3/02*    (2006.01)
*G06F 1/16*    (2006.01)

(52) U.S. Cl.
CPC .......... *G06F 3/0202* (2013.01); *G06F 1/1616* (2013.01); *G06F 1/1662* (2013.01)

(58) Field of Classification Search
CPC ..... G06F 3/0202; G06F 1/1616; G06F 1/1662
See application file for complete search history.

(56) References Cited

U.S. PATENT DOCUMENTS

2002/0085337 A1* 7/2002 Rubenson ............. G06F 1/1662
361/679.09
2003/0057076 A1  3/2003 Lee et al.
2010/0273542 A1* 10/2010 Holman, IV ........ H04M 1/0237
455/575.4

(Continued)

FOREIGN PATENT DOCUMENTS

KR   10-2003-0025701 A   3/2003
KR       20-0335894      12/2003

(Continued)

*Primary Examiner* — Amit Chatly
(74) *Attorney, Agent, or Firm* — Cha & Reiter, LLC

(57) ABSTRACT

An electronic device according to various embodiments of the present invention comprises: a housing; a keyboard arranged on the front surface of the housing; a plurality of first magnets arranged along the periphery of the keyboard; and a keyboard cover comprising a cover portion that covers the keyboard and a plurality of second magnets arranged on the edge of the cover portion so as to correspond to the plurality of first magnets, respectively, wherein the keyboard cover can be attached to/detached from the front surface of the housing by means of the drawing force between the plurality of first magnets and the plurality of second magnets. Various other embodiments are also possible.

13 Claims, 20 Drawing Sheets

(56) References Cited

U.S. PATENT DOCUMENTS

| | | | |
|---|---|---|---|
| 2011/0273821 A1* | 11/2011 | Shen | G06F 1/1616 |
| | | | 361/679.01 |
| 2013/0279141 A1 | 10/2013 | Chen | |
| 2014/0160654 A1* | 6/2014 | Yoo | G06F 1/1681 |
| | | | 361/679.12 |
| 2016/0239100 A1 | 8/2016 | Huang et al. | |
| 2016/0327986 A1* | 11/2016 | Farahani | G06F 1/1662 |
| 2017/0102740 A1* | 4/2017 | Kuscher | G06F 1/1662 |
| 2017/0227991 A1* | 8/2017 | Kuscher | H04B 5/0031 |

FOREIGN PATENT DOCUMENTS

| | | |
|---|---|---|
| KR | 20-0348584 | 4/2004 |
| KR | 10-2010-0135150 A | 12/2010 |
| KR | 10-2012-0067429 A | 6/2012 |
| KR | 10-2013-0043768 A | 5/2013 |
| KR | 10-1474748 B1 | 12/2014 |
| KR | 10-2016-0062455 A | 6/2016 |

\* cited by examiner

ELECTRONIC DEVICE COMPRISING KEYBOARD COVER

CROSS-REFERENCE TO RELATED APPLICATIONS

This application is a U.S. National Stage application under 35 U.S.C. § 371 of an International application filed on Sep. 5, 2017 and assigned application number PCT/KR2017/009701, which claimed the priority of a Korean patent application filed on Sep. 5, 2016 in the Korean Intellectual Property Office and assigned Serial number 10-2016-0114012, the entire disclosures of which are hereby incorporated by reference.

TECHNICAL FIELD

Various embodiments of the present disclosure relate to electronic devices, e.g., electronic devices with a keyboard cover.

BACKGROUND ART

The term "electronic device" may mean a device performing a particular function according to its equipped program, such as a home appliance, an electronic scheduler, a portable multimedia player, a mobile communication terminal, a tablet PC, a video/sound device, a desktop PC or laptop computer, a navigation for automobile, etc. For example, electronic devices may output stored information as voices or images. Portable electronic devices, e.g., laptop computers, tablet PCs, electronic schedulers, portable multimedia players, or mobile communication terminals typically come with a display device and a battery.

There are various types of input devices for electronic devices. For example, desktop computers are equipped with an input device, such as a keyboard and a mouse, and home appliances pack a remote controller. For mobile communication terminals or other electronic devices, microphones or keypads are utilized as typical input devices, and for laptop computers, touchpads and keyboards may be equipped in laptop computers as a replacement for mice.

DETAILED DESCRIPTION OF THE INVENTION

Technical Problem

A display device of a laptop computer may be coupled to be 360-degree rotatable about the housing of the laptop computer. Where the laptop computer is folded to allow the rear surface of the display device to face the rear surface of the housing and to thus switch into tablet mode, the keyboard of the laptop computer may be rendered to face in the opposite direction to the front surface of the display device. Where the user grips the laptop computer to use the laptop computer in tablet mode, the keyboard may be pressed by the user's finger, ending up with unintentional entry. Where the laptop computer is transformed to switch into movie mode by making the angle between the rear surface of the display and the rear surface of the housing range from about 0 degrees to about 90 degrees, the keyboard may come in contact with the top of the desk or table. In contact with the desk or tabletop, the keyboard may be pressed, ending up with unintentional entry or influx of foreign bodies.

According to various embodiments of the present disclosure, the keyboard of the electronic device is prevented from an unintentional pressing upon switching into tablet mode or movie mode.

According to various embodiments of the present disclosure, the keyboard of the electronic device is prevented from influx of a foreign body.

Technical Solution

According to various embodiments of the present disclosure, an electronic device comprises a housing, a keyboard disposed on a front surface of the housing, a plurality of first magnets arranged along a periphery of the keyboard, and a keyboard cover including a cover portion to cover the keyboard and a plurality of second magnets arranged along a periphery of the cover portion so that each of the plurality of second magnets corresponds to a respective one of the plurality of first magnets, wherein the keyboard cover may be detachably attached onto the front surface of the housing by attractive force between the plurality of first magnets and the plurality of second magnets.

According to various embodiments of the present disclosure, a method for operating an electronic device may comprise rotating a housing to be 0-degree angled with respect to a display device and then detachably attaching a keyboard cover onto a rear surface of the housing to be retained when the electronic device is not used, rotating the housing to be angled to an angle more than 0 degrees and less than 180 degrees with respect to the display device and then detachably attaching the keyboard cover onto the rear surface of the housing in a typing mode of the electronic device, rotating the housing to be 360-degree angled with respect to the display device and then detachably attaching the keyboard cover onto the keyboard in a tablet mode of the electronic device to prevent a user's touch, and rotating the housing to be angled to an angle more than 180 degrees and less than 360 degrees with respect to the display device and then detachably attaching the keyboard cover onto the keyboard in a move mode of the electronic device, wherein the rear surface of the housing is rendered to face a rear surface of the display device by a relative rotation, and the keyboard cover covers the keyboard to prevent an external force from being exerted to the keyboard.

Advantageous Effects

According to various embodiments of the present disclosure, as the keyboard cover covers the keyboard by attractive force between the plurality of first magnets arranged on the housing and the plurality of second magnets arranged on the keyboard cover, the electronic device may be prevented from the user's unintentional entry on the keyboard.

According to various embodiments of the present disclosure, as the keyboard cover is attached to the front surface of the housing while covering the keyboard, the electronic device may be prevented from influx of a foreign body into the keyboard.

Figure 1:
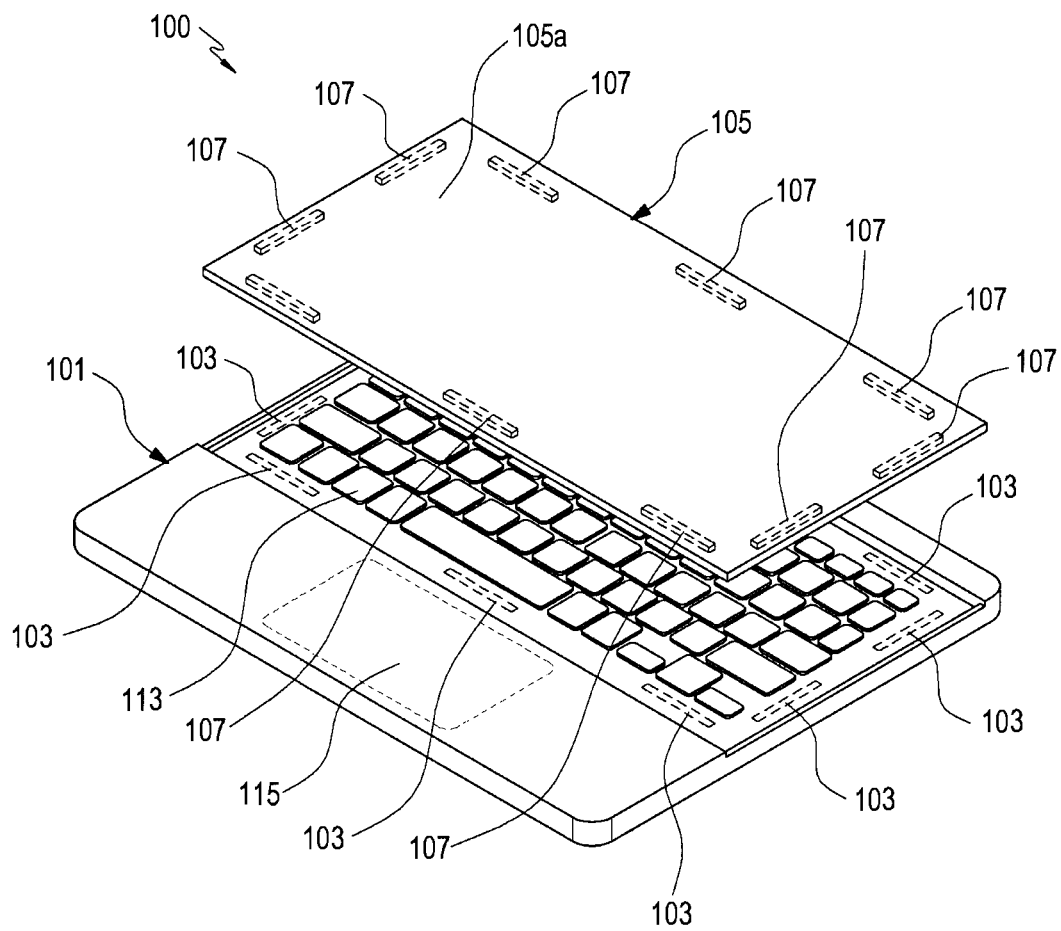
FIG. 1 is a perspective view illustrating a configuration of an electronic device according to an embodiment of the present disclosure.

100: electronic device
101: housing
103: first magnets
105: keyboard cover
107: second magnets
113: keyboard

MODE FOR CARRYING OUT THE INVENTION

Hereinafter, embodiments of the present disclosure are described with reference to the accompanying drawings. However, it should be appreciated that the present disclosure is not limited to the embodiments, and all modifications and/or equivalents or alternatives thereto also belong to the scope of the present disclosure. The same or similar reference denotations may be used to refer to the same or similar elements throughout the specification and the drawings.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and/or order and are used to distinguish a component from another without limiting the components. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

The terms as used herein are provided merely to describe some embodiments thereof, but not to limit the scope of other embodiments of the present disclosure. It is to be understood that the singular forms "a," "an," and "the" include plural references unless the context clearly dictates otherwise. The terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

FIG. 1 is a perspective view illustrating a configuration of an electronic device according to an embodiment of the present disclosure.

Referring to FIG. 1, according to an embodiment of the present disclosure, an electronic device 100 may include a housing 101, a keyboard 113, a plurality of first magnets 103, and a keyboard cover 105.

The housing 101 may include a main board, a central processing unit (CPU) mounted on the main board, a storage medium, and a battery connected to the main board to supply power. The housing 101 may be formed of metal or plastic. According to various embodiments, the housing 101 may be formed of various non-magnetic materials without being limited to metal or plastic. For example, the housing 101 may be formed of aluminum.

The keyboard 113 may be mounted on the front surface of the housing 101. The keyboard 113 may be pressed by an external force from the outside, producing an input signal.

A touchpad 115 may be mounted on the front surface of the housing 101. The touchpad 105 may be positioned adjacent the keyboard 113. The touchpad 115 may be implemented in a capacitive type and be touched by the user's body part, e.g., finger, producing an input signal.

The plurality of first magnets 103 may be mounted along the periphery of the keyboard 113 on the housing 101. The plurality of first magnets 103 may have an N pole in the direction perpendicular to the front surface of the housing 101. According to various embodiments, the plurality of second magnets 103 may have an S pone in the direction perpendicular to the front surface of the housing 101.

The keyboard cover 105 may include a cover portion 105a to cover the keyboard 113 and a plurality of second magnets 107 arranged at the edge of the cover portion 105a.

The cover portion 105a may be formed of metal or plastic. According to various embodiments, the cover portion 105a may be formed of various non-magnetic materials without being limited to metal or plastic. For example, the cover portion 105a may be formed of aluminum.

The plurality of second magnets 107 may be arranged on the cover portion 105, corresponding to the plurality of first magnets 103. For example, where the plurality of second magnets 107 have an N pole in the direction perpendicular to the front surface of the housing 101, the plurality of second magnets 107 may have an S pole towards the plurality of first magnets 103.

Figure 2:
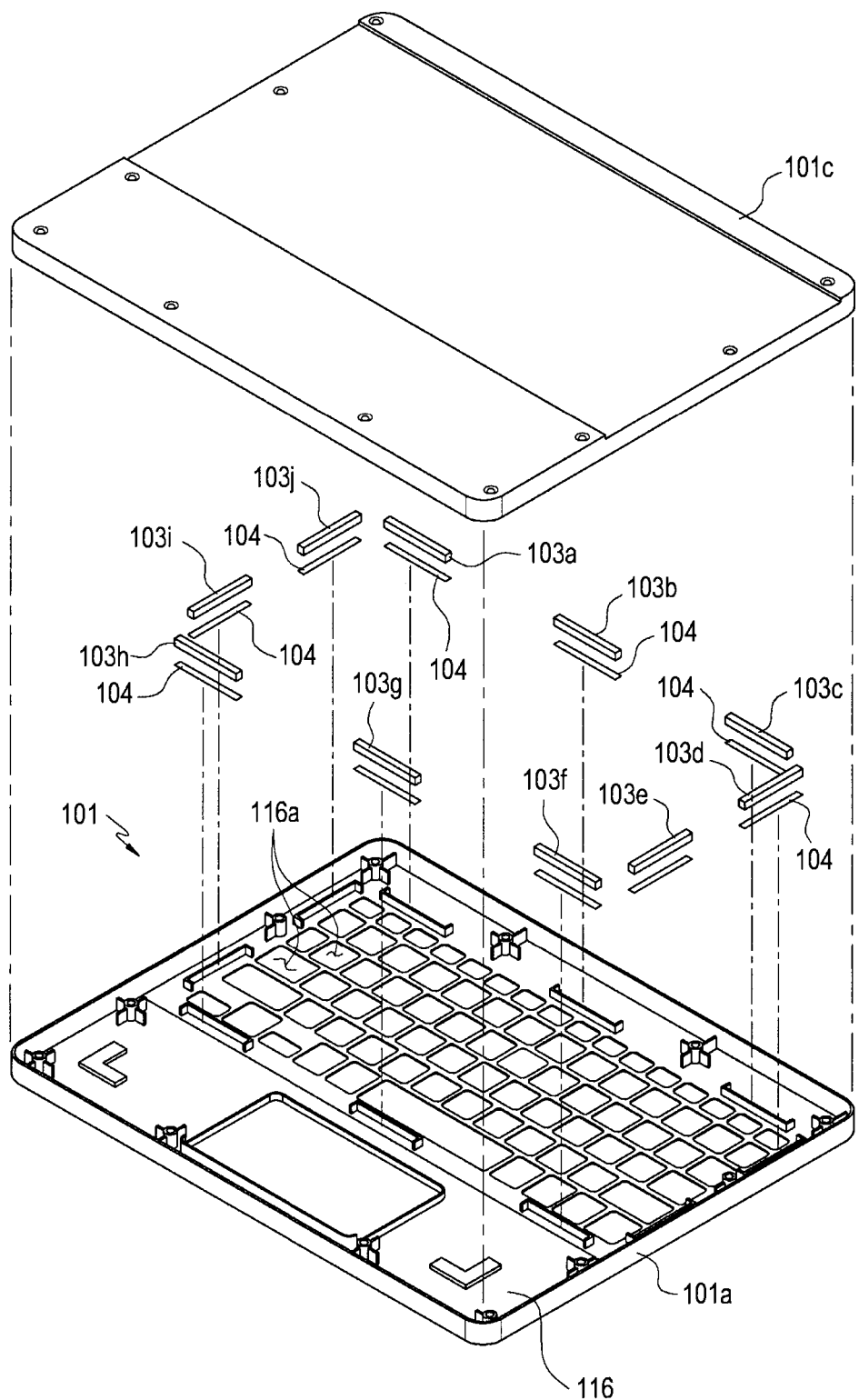
FIG. 2 is an exploded perspective view illustrating a housing of an electronic device according to an embodiment of the present disclosure.

FIG. 2 is an exploded perspective view illustrating a housing of an electronic device according to an embodiment of the present disclosure.

Referring to FIG. 2, according to an embodiment of the present disclosure, a housing 101 of an electronic device may include a front housing 101a and a rear housing 101c.

Through holes 116a may be formed through keys of a keyboard (113 of FIG. 1) in an inner surface 116 of the front housing 101a. A plurality of first magnets 103a, 103b, 103c, 103d, 103e, 103f, 103g, 103h, 103i, and 103j may be mounted along the periphery of the through holes 116a on the inner surface 116 of the front housing 101a. The plurality of first magnets 103a, 103b, 103c, 103d, 103e, 103f, 103g, 103h, 103i, and 103j may be attached onto the inner surface 116 of the first housing using attaching members 104. The attaching members 104 may be double-sided tapes. According to an embodiment, the attaching members 104 may be formed of various adhesive substances without being limited to double-sided tapes.

Figure 3:
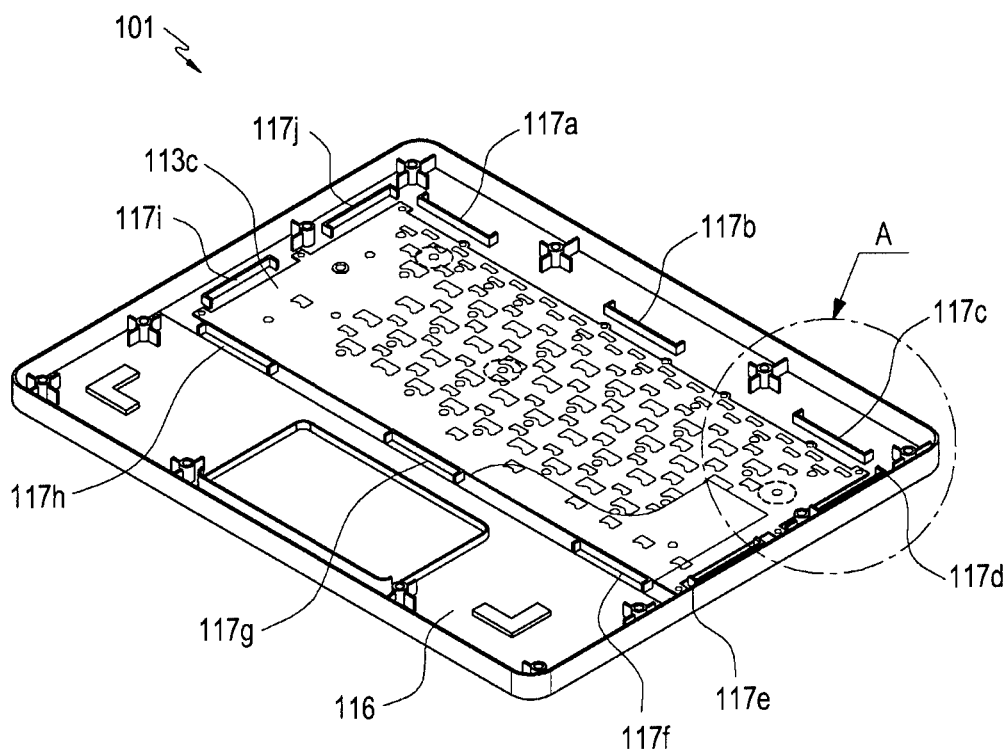
FIG. 3 is a perspective view illustrating a front housing of an electronic device according to an embodiment of the present disclosure.
Figure 4:
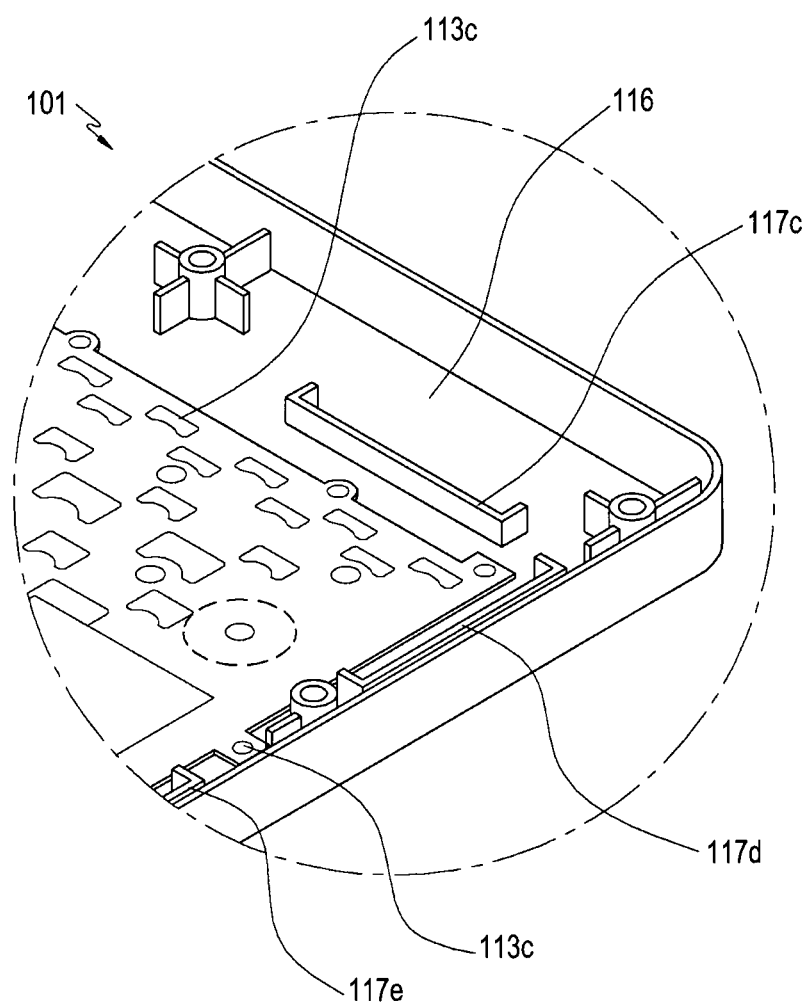
FIG. 4 is an enlarged view of portion A of FIG. 3.
Figure 5:
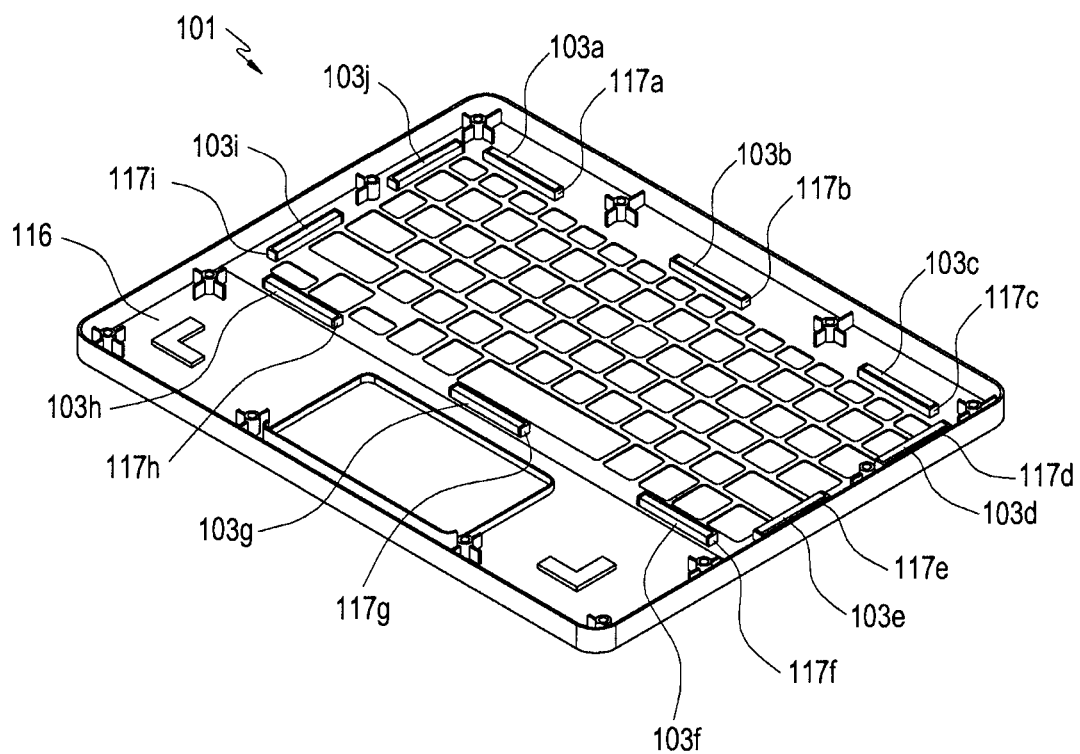
FIG. 5 is a perspective view illustrating an example in which a plurality of first magnets are combined in a front housing of an electronic device according to an embodiment of the present disclosure.

FIG. 3 is a perspective view illustrating a front housing of an electronic device according to an embodiment of the present disclosure. FIG. 4 is an enlarged view of portion A of FIG. 3. FIG. 5 is a perspective view illustrating an example in which a plurality of first magnets are combined in a front housing of an electronic device according to an embodiment of the present disclosure.

Referring to FIGS. 3 to 5, according to an embodiment of the present disclosure, an electronic device 101 may include a plurality of mounting units 117a, 117b, 117c, 117d, 117e, 117f, 117g, 117h, 117i, and 117j.

The plurality of mounting units 117a, 117b, 117c, 117d, 117e, 117f, 117g, 117h, 117i, and 117j may be arranged on an inner surface 116 of a first housing along a rear surface 113c of a keyboard. The plurality of mounting units 117a, 117b, 117c, 117d, 117e, 117f, 117g, 117h, 117i, and 117j may at least partially surround the respective side surfaces of, and fasten, a plurality of first magnets 103a, 103b, 103c, 103d, 103e, 103f, 103g, 103h, 103i, and 103j. The plurality of mounting units 117a, 117b, 117c, 117d, 117e, 117f, 117g, 117h, 117i, and 117j may be formed of plastic. According to various embodiments, the plurality of mounting units 117a, 117b, 117c, 117d, 117e, 117f, 117g, 117h, 117i, and 117j may be formed of various rigid materials, e.g., metal, without being limited to plastic.

Figure 6:
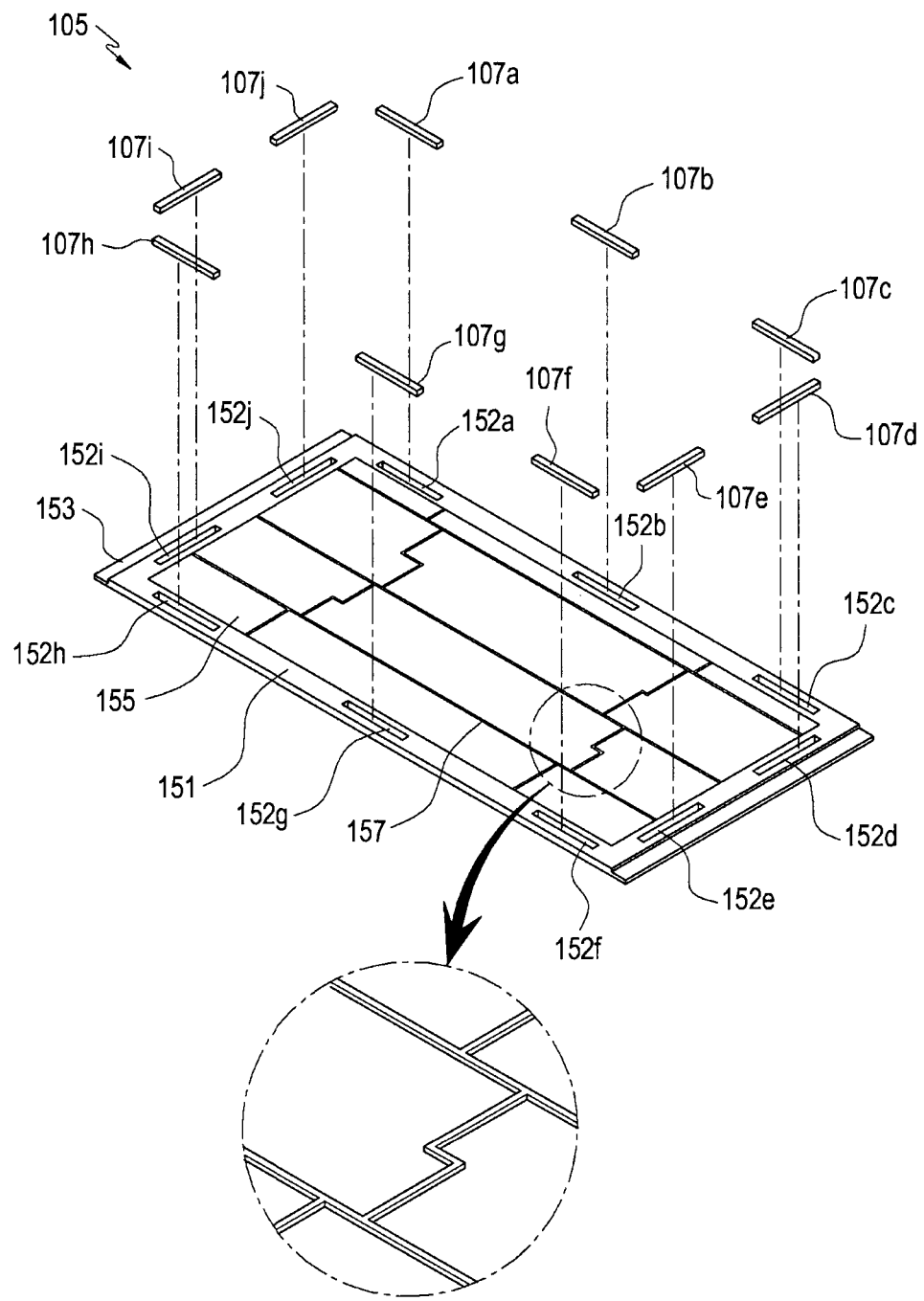
FIG. 6 is an exploded perspective view illustrating a keyboard cover of an electronic device according to an embodiment of the present disclosure.

FIG. 6 is an exploded perspective view illustrating a keyboard cover of an electronic device according to an embodiment of the present disclosure.

Referring to FIG. 6, according to an embodiment of the present disclosure, a keyboard cover 105 of an electronic device may include a cover portion 105a, a plurality of holes 152a, 152b, 152c, 152d, 152e, 152f, 152g, 152h, 151i, and 152j, a plurality of second magnets 107a, 107b, 107c, 107d, 107e, 107f, 107g, 107h, 107i, and 107j, and a guide unit 157.

An inner surface of the cover portion 105a may include a first surface 151, a second surface 153, and a third surface 155. The first surface 151 may be formed along an edge of the cover portion 105a. The second surface 153 may be positioned on a different plane from the first surface 151 and formed at both ends of the cover portion 105a. The third surface 155 may be positioned on a different plane from the first surface 151 and be surrounded by the first surface 151.

The plurality of holes 152a, 152b, 152c, 152d, 152e, 152f, 152g, 152h, 151i, and 152j may be arranged in the first surface 151. The plurality of holes 152a, 152b, 152c, 152d, 152e, 152f, 152g, 152h, 151i, and 152j, respectively, may receive the plurality of second magnets 107a, 107b, 107c, 107d, 107e, 107f, 107g, 107h, 107i, and 107j. The plurality of second magnets 107a, 107b, 107c, 107d, 107e, 107f, 107g, 107h, 107i, and 107j may be fastened using attaching members (not shown) while being received in the plurality of holes 152a, 152b, 152c, 152d, 152e, 152f, 152g, 152h, 151i, and 152j. With the plurality of second magnets 107a, 107b, 107c, 107d, 107e, 107f, 107g, 107h, 107i, and 107j fastened while being received in the plurality of holes 152a, 152b, 152c, 152d, 152e, 152f, 152g, 152h, 151i, and 152j, the respective externally exposed portions of the plurality of second magnets 107a, 107b, 107c, 107d, 107e, 107f, 107g, 107h, 107i, and 107j may be hidden by plating or coloring the inner surface of the cover portion 105a. According to various embodiments, the respective externally exposed portions of the plurality of second magnets 107a, 107b, 107c, 107d, 107e, 107f, 107g, 107h, 107i, and 107j may be shut off from the outside using a color tape.

The guide unit 157 may project from the third surface 155. The guide unit 157 may reinforce the hardness of the cover portion 105a.

Figure 7:
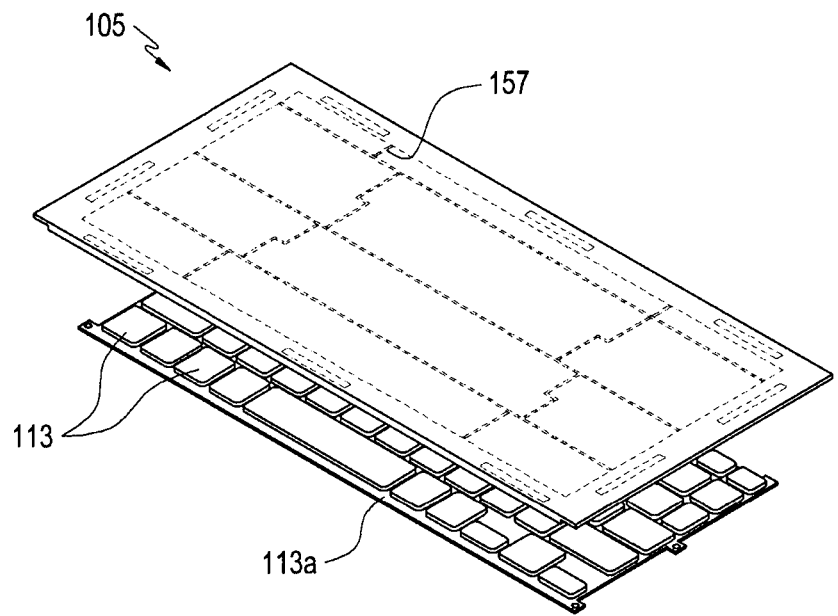
FIG. 7 is a perspective view illustrating a keyboard cover and keyboard of an electronic device according to an embodiment of the present disclosure.
Figure 8:
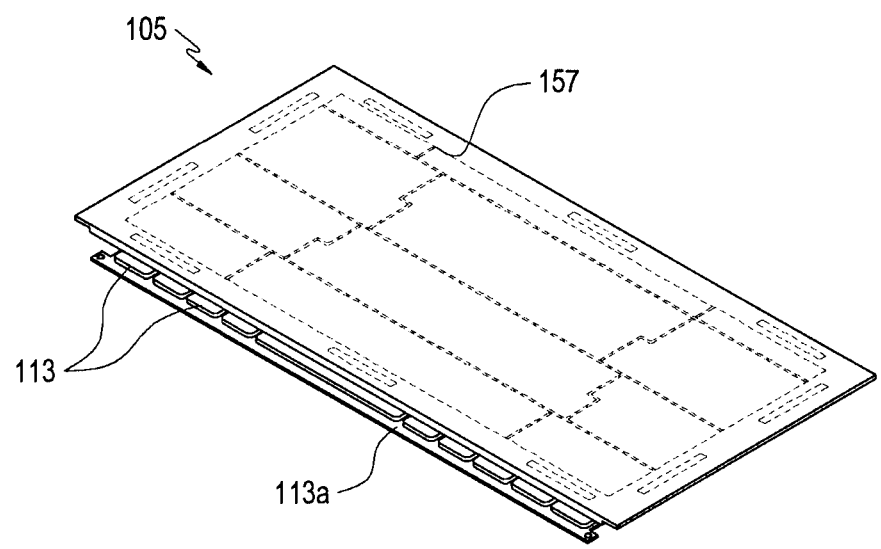
FIG. 8 is a perspective view illustrating an example in which a keyboard cover of an electronic device is closely positioned on a keyboard according to an embodiment of the present disclosure.

FIG. 7 is a perspective view illustrating a keyboard cover and keyboard of an electronic device according to an embodiment of the present disclosure. FIG. 8 is a perspective view illustrating an example in which a keyboard cover of an electronic device is closely positioned on a keyboard according to an embodiment of the present disclosure.

Referring to FIGS. 7 and 8, a keyboard cover 105 may cover a keyboard 113 in a larger area than a substrate 113a of the keyboard 113.

As the guide unit 157 is disposed between the keys of the keyboard 113, the keyboard cover 105 may be seated on the keyboard 113, coming in tight contact with the keyboard 113.

Figure 9:
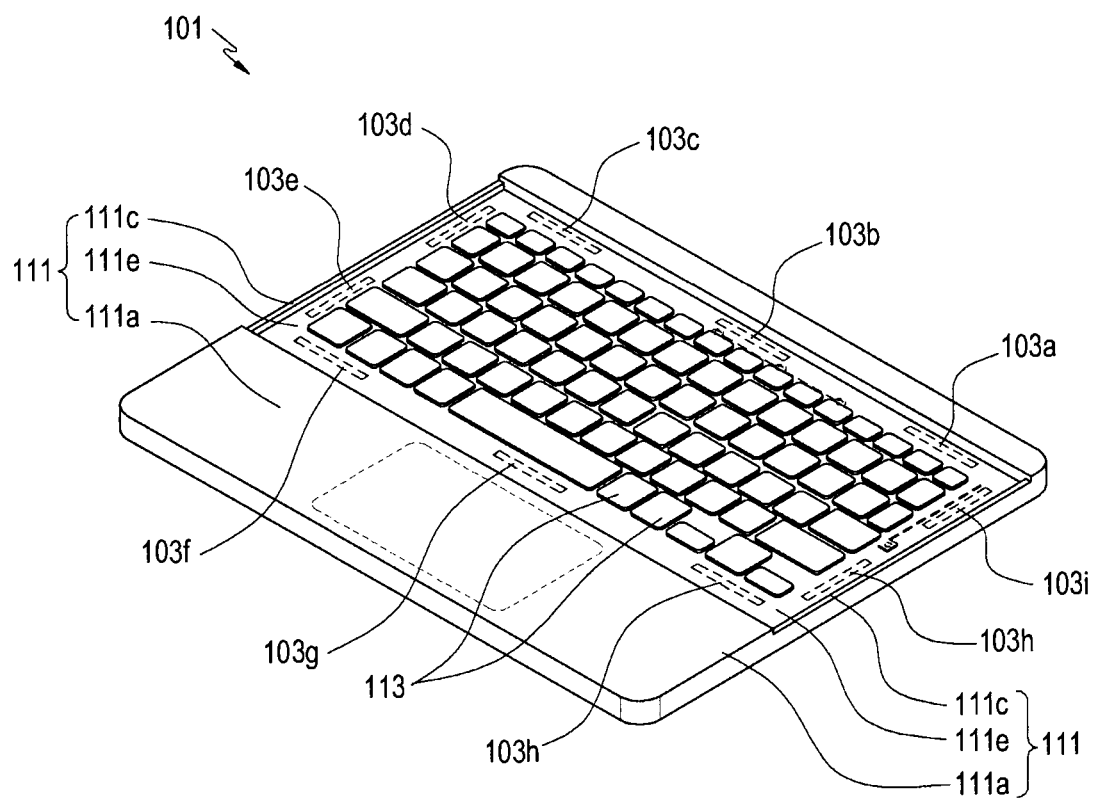
FIG. 9 is a front perspective view illustrating a housing of an electronic device according to an embodiment of the present disclosure.

FIG. 9 is a front perspective view illustrating a housing of an electronic device according to an embodiment of the present disclosure.

Referring to FIG. 9, according to an embodiment of the present disclosure, a front surface 111 of a housing 101 of an electronic device may include a first surface 111a, a second surface 113c, and a third surface 113e.

The second surface 111c may be positioned on a different plane from the first surface 111a. Where a keyboard cover (105 of FIG. 6) covers the keyboard, the second surface 111c may face a second surface (153 of FIG. 6) of the keyboard cover.

The third surface 111e may be positioned on a different plane from the first surface 111a and on a different plane from the second surface 111c. The keyboard may be disposed on the third surface 111c. Where the keyboard cover (105 of FIG. 6) covers the keyboard, the third surface 111e may come in contact with the first surface (151 of FIG. 6) of the keyboard cover.

Figure 10:
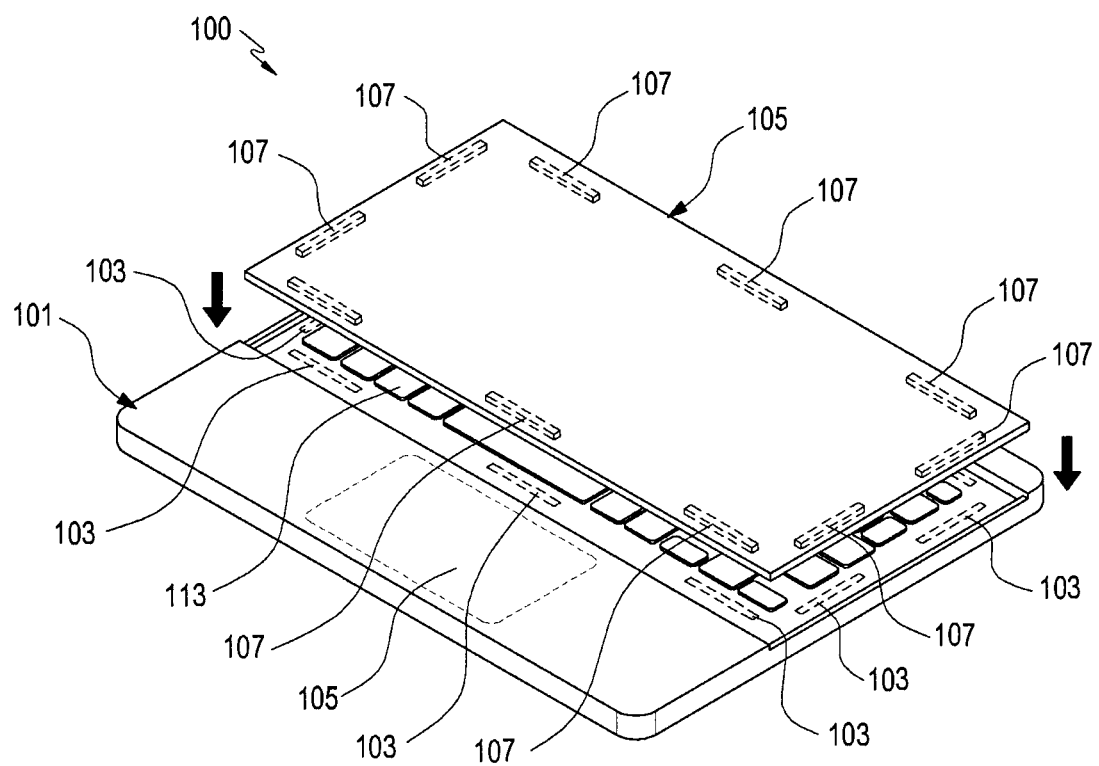
FIG. 10 is a perspective view illustrating an electronic device before a keyboard cover is combined to a front surface of a housing of the electronic device according to an embodiment of the present disclosure.
Figure 11:
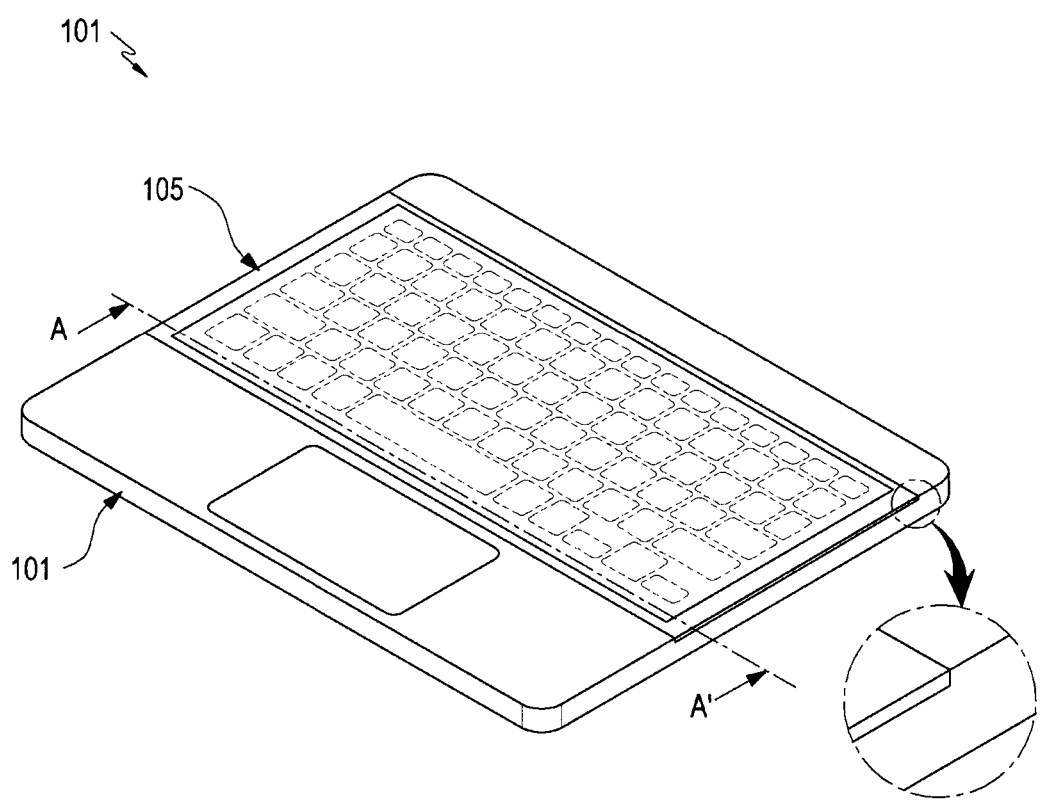
FIG. 11 is a perspective view illustrating an example in which a keyboard cover is combined to a front surface of a housing of an electronic device according to an embodiment of the present disclosure.
Figure 12:
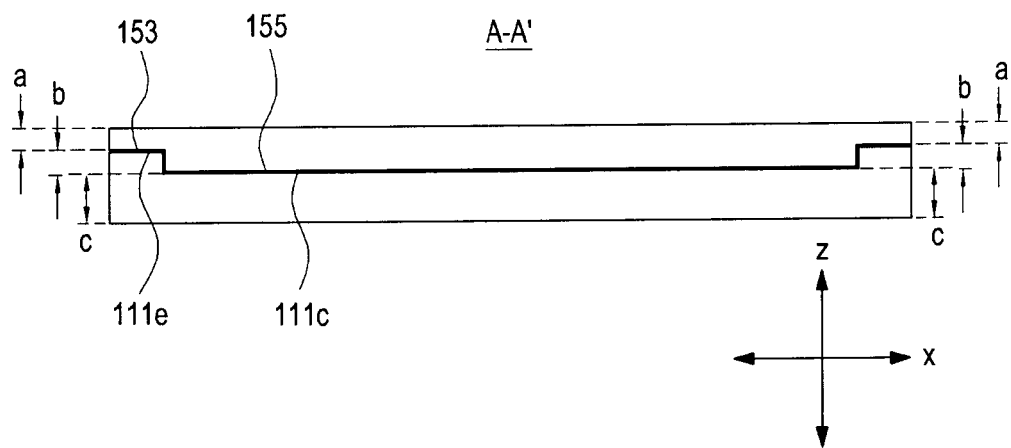
FIG. 12 is a cross-sectional view taken along line A-A' of FIG. 11.
Figure 13:
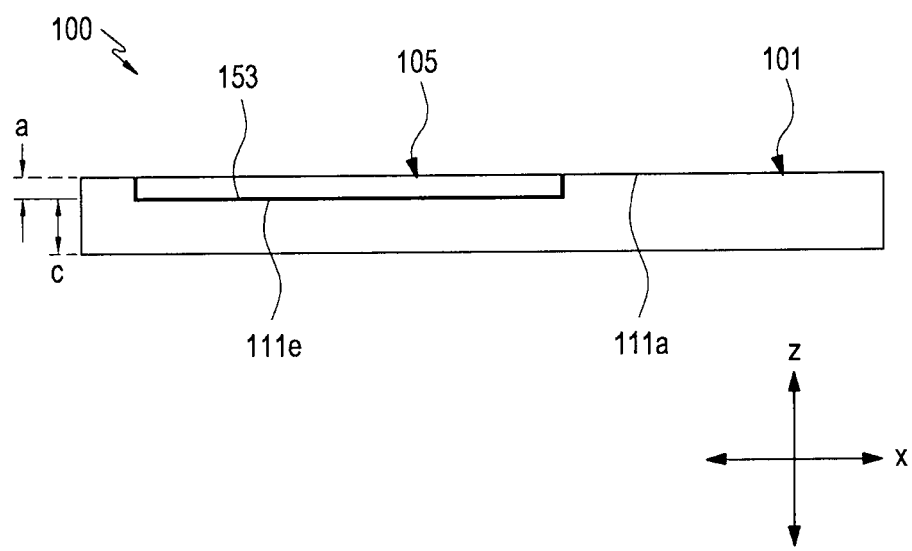
FIG. 13 is a side view illustrating an example in which a keyboard cover is combined to a front surface of a housing of an electronic device according to an embodiment of the present disclosure.

FIG. 10 is a perspective view illustrating an electronic device before a keyboard cover is combined to a front surface of a housing of the electronic device according to an embodiment of the present disclosure. FIG. 11 is a perspective view illustrating an example in which a keyboard cover is combined to a front surface of a housing of an electronic device according to an embodiment of the present disclosure. FIG. 12 is a cross-sectional view taken along line A-A' of FIG. 11. FIG. 13 is a side view illustrating an example in which a keyboard cover is combined to a front surface of a housing of an electronic device according to an embodiment of the present disclosure.

Referring to FIG. 10, if a keyboard cover 105 comes close on a keyboard 113, attractive force may occur between a plurality of first magnets 103 and a plurality of second magnets 107, allowing the keyboard cover 105 to detachably attach onto the keyboard 113.

With the keyboard cover 105 attached onto the keyboard 113, a first surface 111a of a housing may be placed on the same plane as the front surface of the keyboard cover 105. As a first surface 151 of the keyboard cover 105 comes in contact with a third surface 111e of the housing, the keyboard cover 105 may be seated on the third surface 111e of the housing. A second surface 153 of the keyboard cover may face a second surface 111c of the housing. The difference in height between the second surface 111c and third surface 111e of the housing is length b gives the housing 101 a first hooking part that corresponds to the second surface 111c. The difference in height between the first surface 151 and second surface 153 of the keyboard cover is length b gives the keyboard cover 105 a second hooking part that is stuck on the first hooking part while in contact with the second surface 111c of the housing. As the second hooking part is stuck on the first hooking part, the keyboard cover 105 may be stopped from moving along the X axis.

The difference in height between the first surface 111a and second surface 111c of the housing may be length a. Length a may be the thickness of both ends of the keyboard cover 105. Referring to FIG. 13, viewing the side surface of the electronic device, the second surface 153 of the keyboard cover may be seated facing the second surface 111c of the housing. The keyboard cover 105 may be stopped from moving along the Y axis by as much difference in height as length a.

Figure 14:
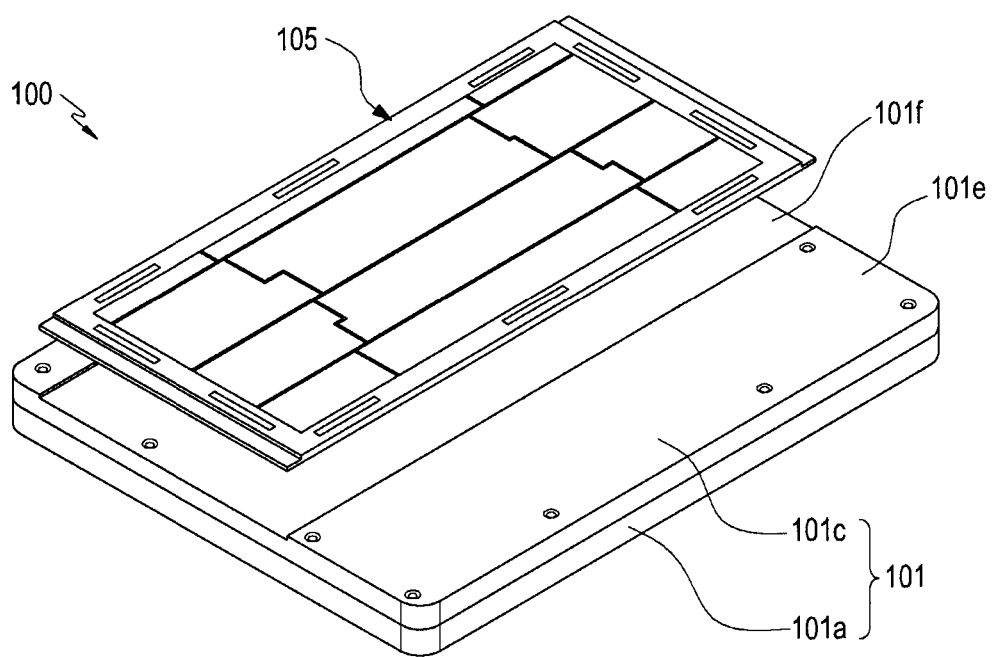
FIG. 14 is a perspective view illustrating an electronic device before a keyboard cover is combined to a rear surface of a housing of the electronic device according to an embodiment of the present disclosure.

FIG. 14 is a perspective view illustrating an electronic device before a keyboard cover is combined to a rear surface of a housing of the electronic device according to an embodiment of the present disclosure.

Referring to FIG. 14, according to an embodiment of the present disclosure, a hole 101f may be formed in a rear surface 101e of a housing 101 of an electronic device 100.

The hole 101f may at least partially receive a keyboard cover 105 while corresponding to the size of the keyboard cover 105.

As the keyboard cover 105 is placed on the hole 101f, the keyboard cover 105 may be detachably attached onto the rear surface 101e of the housing by attractive force between a plurality of first magnets (103 of FIG. 10) and a plurality of second magnets (107 of FIG. 10).

Figure 15A:
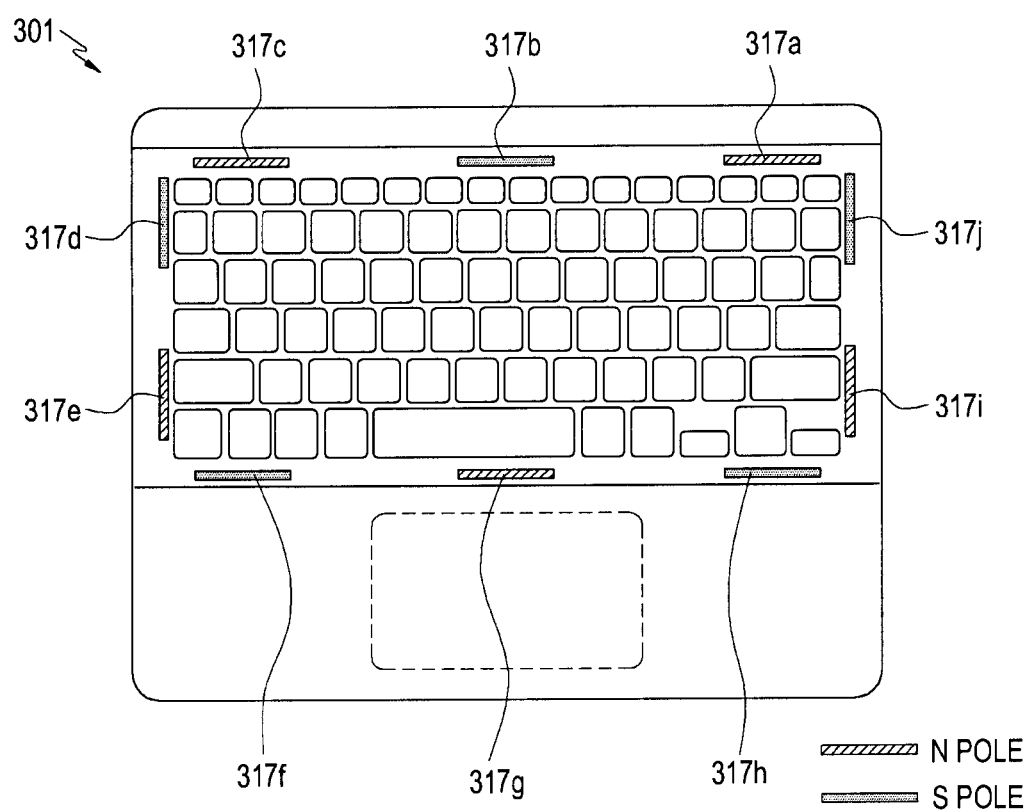
FIG. 15a is a front view illustrating a housing of an electronic device according to another embodiment of the present disclosure.
Figure 15B:
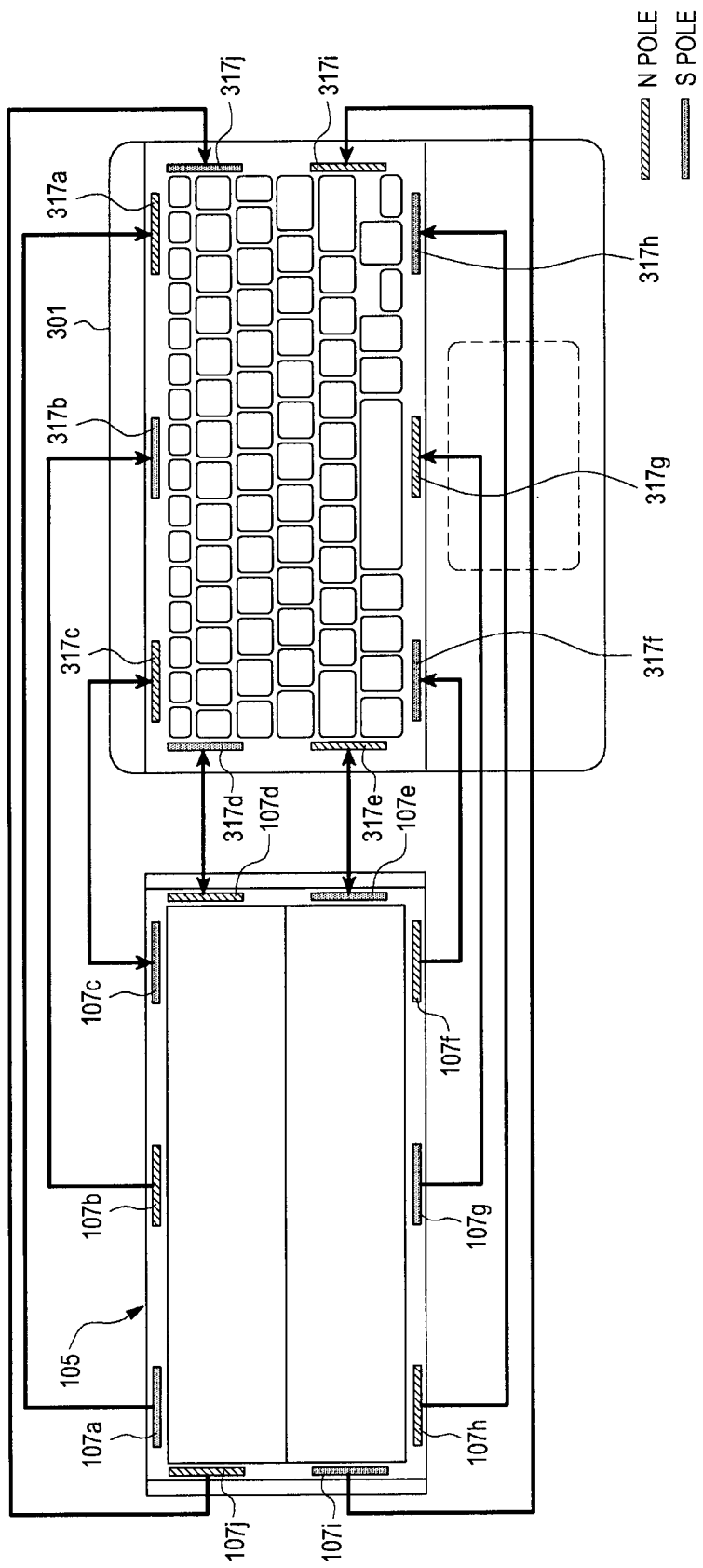
FIG. 15b is a view illustrating attractive force between a plurality of first magnets and a plurality of second magnets according to another embodiment of the present disclosure.

FIG. 15a is a front view illustrating a housing of an electronic device according to another embodiment of the present disclosure. FIG. 15b is a view illustrating attractive force between a plurality of first magnets and a plurality of second magnets according to another embodiment of the present disclosure.

Referring to FIGS. 15a and 15b, according to another embodiment of the present disclosure, a plurality of first magnets 317a, 317b, 317c, 317d, 317e, 317f, 317g, 317h, 317i, and 317j may be mounted in a housing 301 of an electronic device.

The plurality of first magnets may include first magnets 317a, 317c, 317e, 317g, and 317i having a first polarity in a first direction and second magnets 317b, 317d, 317f, 317h, and 317j having a second polarity in a second direction opposite to the first direction. The first direction may mean a direction perpendicular to the front surface of the housing. The first polarity may be, e.g., an N pole, and the second polarity may be, e.g., an S pole.

The first magnets 317a, 317c, 317e, 317g, and 317i having the first polarity and the first magnets 317b, 317d, 317f, 317h, and 317j having the second polarity may alternately be arranged along the periphery of the keyboard.

According to another embodiment of the present disclosure, second magnets 107a, 107b, 107c, 107d, 107e, 107f, 107g, 107h, 107i, and 107j having a different polarity, in the second direction, from each of the plurality of first magnets 317a, 317b, 317c, 317d, 317e, 317f, 317g, 317h, 317i, and 317j may be arranged on the rear surface of the keyboard cover 105 of the electronic device. For example, the second magnets 107b, 107d, 107f, 107h, and 107j with the first polarity and the second magnets 107a, 107c, 107e, 107g, and 107i with the second polarity may be alternately arranged along the periphery of the keyboard cover 105.

As the keyboard cover 105 comes close onto the keyboard, the first magnets 317a, 317c, 317e, 317g, and 317i and the second magnets 107a, 107c, 107e, 107g, and 107i may be attracted therebetween, and the first magnets 317b, 317d, 317f, 317h, and 317j and the second magnets 107a, 107c, 107e, 107g, and 107i may be attracted therebetween.

Figure 15C:
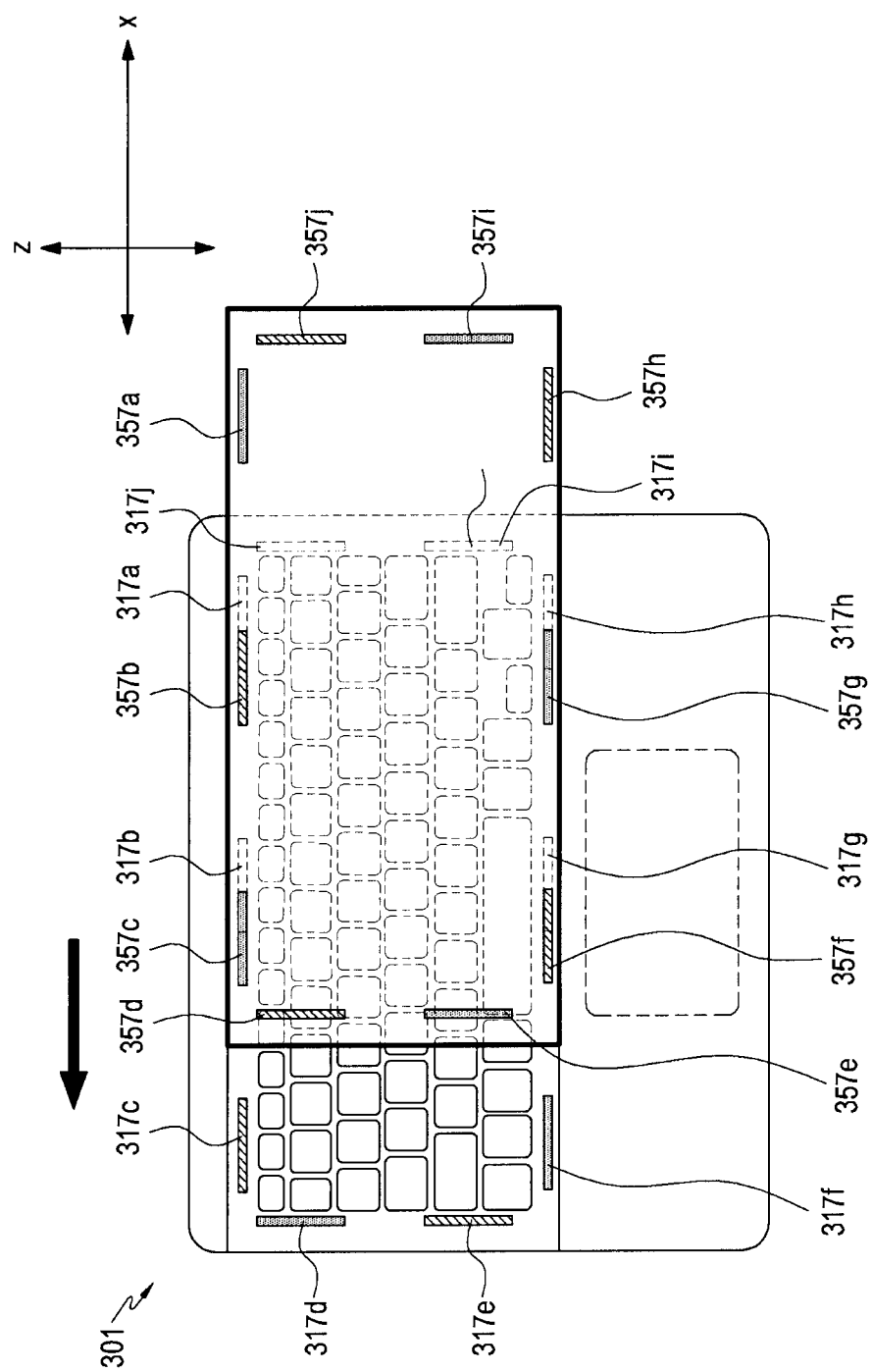
FIG. 15c is a view illustrating repulsion between a plurality of first magnets and a plurality of second magnets according to still another embodiment of the present disclosure.

FIG. 15*c* is a view illustrating repulsion between a plurality of first magnets and a plurality of second magnets according to still another embodiment of the present disclosure.

Referring to FIG. 15*c*, where a keyboard cover escapes off the position where it faces a keyboard, a plurality of second magnets 357*a*, 357*b*, 357*c*, 357*d*, 357*e*, 357*f*, 357*g*, 357*h*, 357*i*, and 357*j*, respectively, may escape off the respective corresponding positions of a plurality of first magnets 317*a*, 317*b*, 317*c*, 317*d*, 317*e*, 317*f*, 317*g*, 317*h*, 317*i*, and 317*j*.

At least one of the plurality of second magnets 357*a*, 357*b*, 357*c*, 357*d*, 357*e*, 357*f*, 357*g*, 357*h*, 357*i*, and 357*j* may be repulsed against at least one of the plurality of first magnets 317*a*, 317*b*, 317*c*, 317*d*, 317*e*, 317*f*, 317*g*, 317*h*, 317*i*, and 317*j*. For example, one 357*c* of the plurality of second magnets may be repulsed against one 317*b* of the plurality of first magnets, moving the keyboard cover along the X axis. As the keyboard cover moves along the X axis, the keyboard cover may be positioned in place facing the keyboard.

Figure 16:
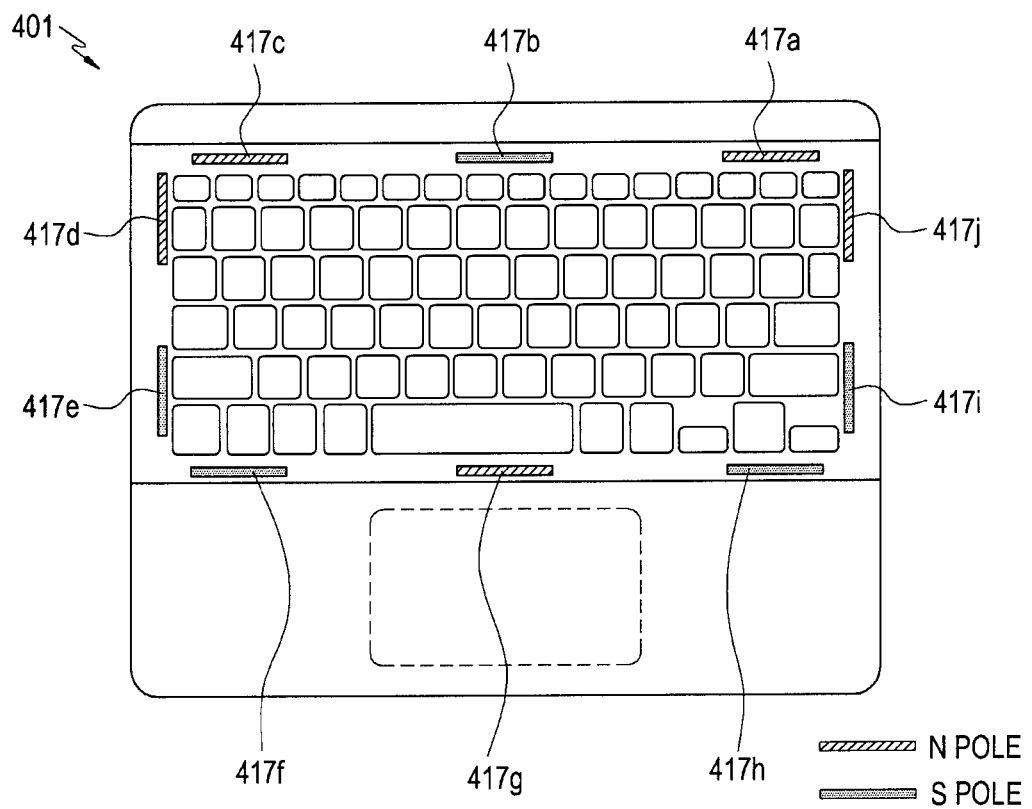
FIG. 16 is a front view illustrating an electronic device according to still another embodiment of the present disclosure.

FIG. 16 is a front view illustrating an electronic device according to still another embodiment of the present disclosure.

Referring to FIG. 16, a plurality of first magnets 417*a*, 417*b*, 417*c*, 417*d*, 417*e*, 417*f*, 417*g*, 417*f*, 417*h*, 417*i*, and 417*j* may be arranged along the periphery of a keyboard.

The plurality of first magnets 417*a*, 417*c*, 417*d*, 417*g*, and 417*j* having a first polarity and the plurality of second magnets 417*b*, 417*e*, 417*f*, 417*h*, and 417*i* having a second polarity might not alternately be arranged along the periphery of the keyboard. According to various embodiments, the plurality of first magnets with the first polarity and the plurality of second magnets with the second polarity are not limited as arranged alternately but may be arranged along the periphery of the keyboard in other various manners.

Figure 17:
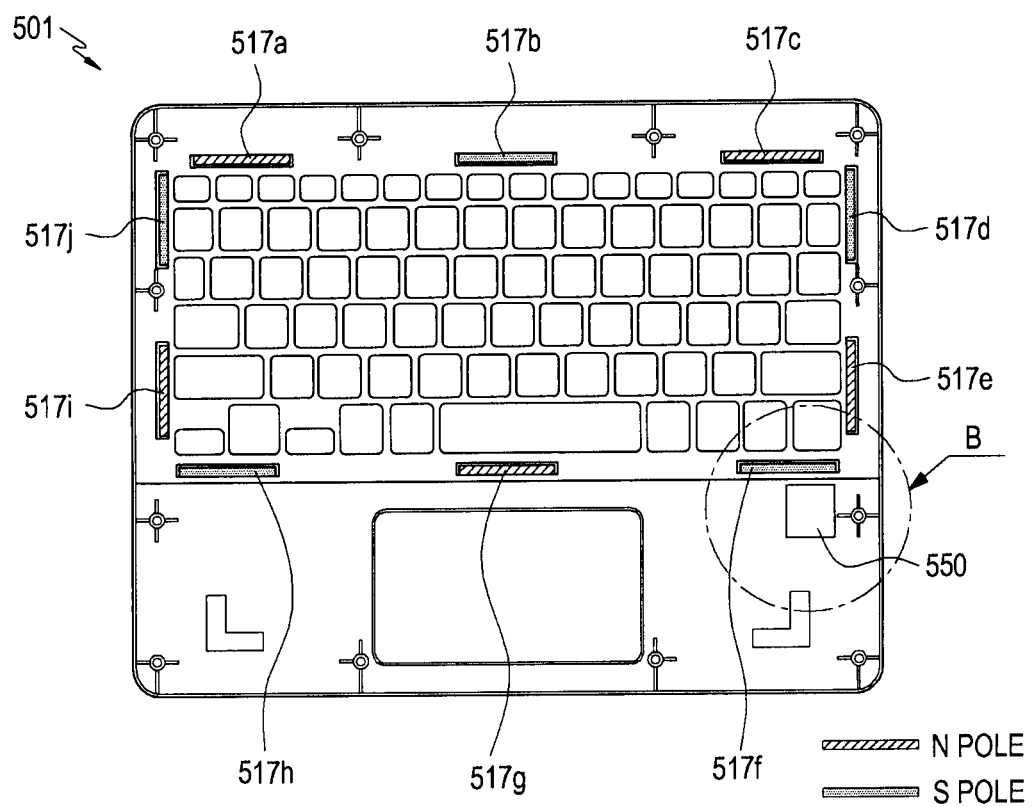
FIG. 17 is a front view illustrating an electronic device according to still another embodiment of the present disclosure.
Figure 18:
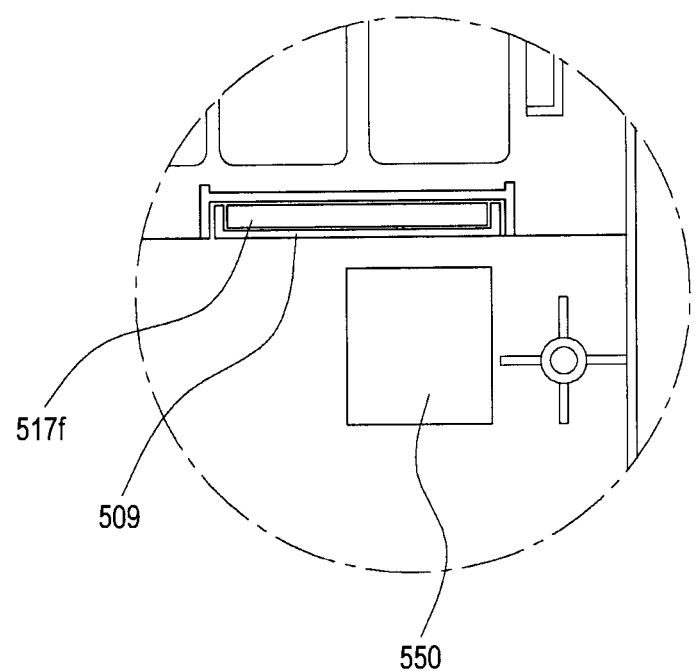
FIG. 18 is an enlarged view of portion B of FIG. 17.

FIG. 17 is a front view illustrating an electronic device according to still another embodiment of the present disclosure. FIG. 18 is an enlarged view of portion B of FIG. 17.

Referring to FIGS. 17 and 18, according to still another embodiment of the present disclosure, an electronic part 550 and a shielding member 509 may be mounted in a housing 501 of an electronic device.

The electronic part 550 may be driven using a magnet. For example, the electronic part 550 may be one among proximity sensors, gyro sensors, hall sensors, or sound parts (e.g., speakers). The plurality of electronic part 550 may be disposed adjacent any one of the plurality of first magnets 517*a*, 517*b*, 517*c*, 517*d*, 517*e*, 517*f*, 517*i*, and 517*j*. For example, the electronic part 550 may be disposed adjacent one 517*f* among the plurality of first magnets.

The shielding member 509 may be disposed between the electronic part 550 and one 517*f* among the plurality of first magnets. The shielding member 509 may at least partially surround the first magnet. The shielding member 509 may be formed of stainless steel. According to various embodiments, the shielding member 509 is not limited as formed of stainless steel but may be formed of various materials shielding magnetic force. The shielding member 509 may shield magnetic force from one 517*f* among the first magnets from flowing to the electronic part 550.

Figure 19:
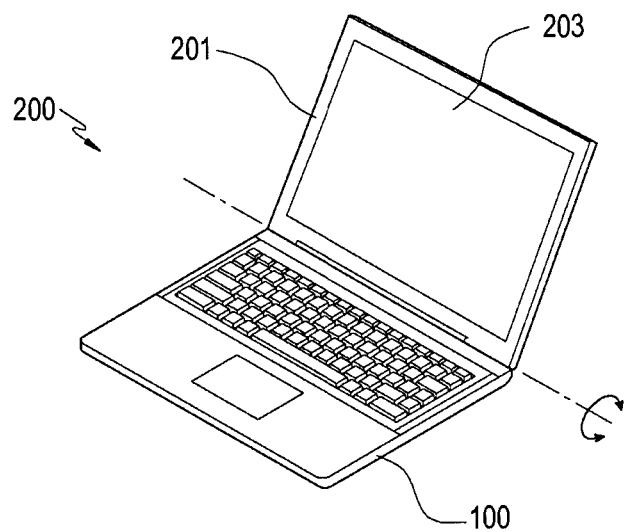
FIG. 19 is a perspective view illustrating an electronic device according to still another embodiment of the present disclosure.

FIG. 19 is a perspective view illustrating an electronic device according to still another embodiment of the present disclosure.

According to another embodiment of the present disclosure, an electronic device 200 may be a laptop computer, a tablet PC with a keyboard, or a mobile communication terminal with a plurality of displays. Described is an example in which the electronic device 200 is a laptop computer.

Referring to FIG. 19, according to another embodiment of the present disclosure, the electronic device 200 may include a display device 201 and a housing 100 rotatably coupled with the display device 201.

The housing 100 may be 360-degree rotated about the display device 201 through a two-axis hinge (not shown). For example, the housing 100 may be rotated about the display device 201 by an angle more than about 0 degrees and less than 180 degrees, switching into a typing mode. For example, the typing mode of the electronic device 200 may be a mode in which the user may type on the keyboard of the housing 100 while viewing the screen 203 of the display device 201. In the typing mode of the electronic device 200, the keyboard cover (105 of FIG. 14) may detachably be coupled to the rear surface (101*e* of FIG. 14) of the housing 100. According to various embodiments, where the electronic device is not used in the state of the housing 100 being rotated about the display device 201 by about 0 degrees, e.g., the state in which the keyboard of the housing 100 faces the screen 201 of the display device, the keyboard cover (105 of FIG. 14) may detachably be coupled to the rear surface (101*e* of FIG. 14) of the housing 100.

Figure 20:
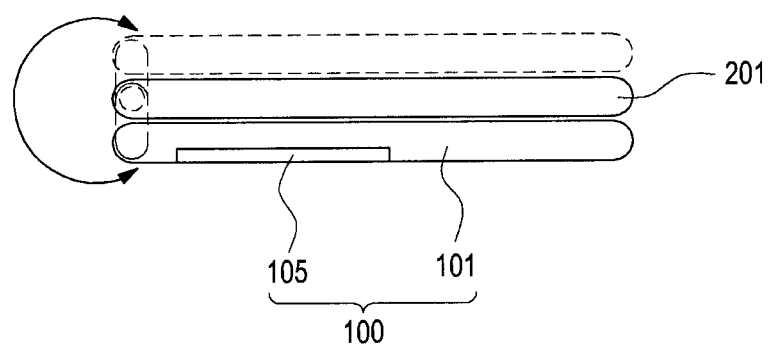
FIG. 20 is a perspective view illustrating an example in which a housing of an electronic device is folded on a display device of the electronic device according to yet still another embodiment of the present disclosure.

FIG. 20 is a perspective view illustrating an example in which a housing of an electronic device is folded on a display device of the electronic device according to yet still another embodiment of the present disclosure.

Referring to FIG. 20, the housing 100 may be rotated about the display device 201 by an angle less than about 360 degrees and less than 180 degrees, switching into a tablet mode. The tablet mode of the electronic device 200 may be a mode in which the keyboard of the housing 101 and the screen of the display device 201 face away from each other. The keyboard cover 105 may prevent the keyboard from being unintentionally pressed by the user's finger where the keyboard covers the keyboard and the user grips the electronic device 200 in the tablet mode. According to various embodiments, where an input signal is produced by touching the display device 201 with the electronic device 200 in the tablet mode placed on an underneath object by the user, the keyboard cover 105 may prevent an input signal from being unintentionally produced as the keyboard is pressed by the underneath object.

According to various embodiments, the housing 100 is rotated by an angle more than about 180 degrees and less than 360 degrees about the display device 201, allowing the electronic device 200 to switch into a movie mode. In the movie mode, the electronic device 200 may be propped, with the front surface of the housing 101 in contact with the underneath object. The keyboard cover 105 may prevent an input signal from being unintentionally produced as the keyboard is pressed by the underneath object.

Figure 21:
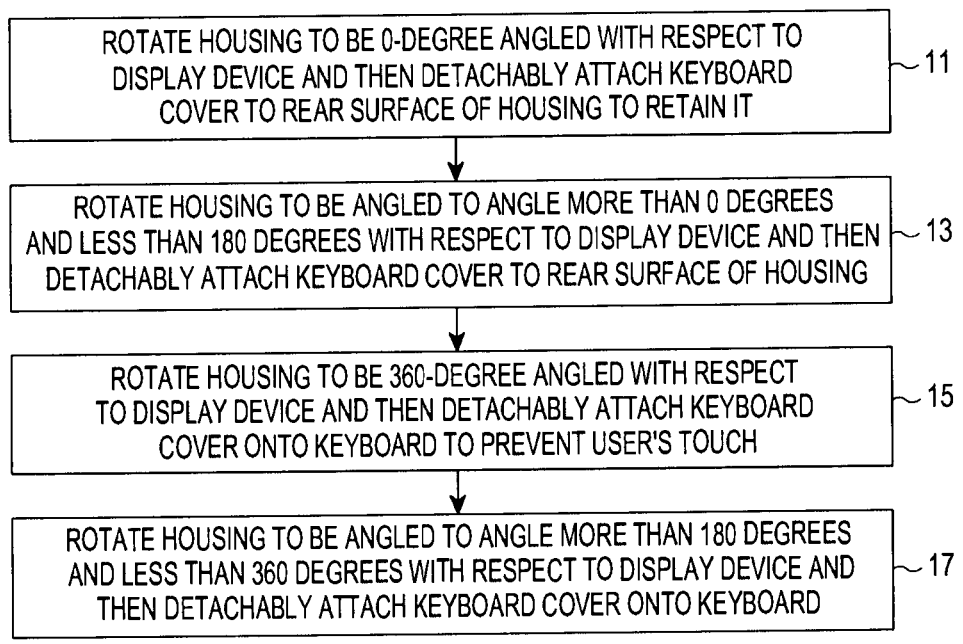
FIG. 21 is a flowchart illustrating a method for operating an electronic device according to an embodiment of the present disclosure.

FIG. 21 is a flowchart illustrating a method for operating an electronic device according to an embodiment of the present disclosure.

Referring to FIG. 21, according to an embodiment of the present disclosure, in operation 11 of a method for operating an electronic device, when the electronic device is not used, the housing may be rotated to be zero-degree angled about the display device and, then, the keyboard cover may detachably be attached and retained on the rear surface of the housing. In operation 13, in the typing mode of the electronic device, the housing may be rotated to be angled to be more than 0 degrees and less than 180 degrees with respect to the display device and, then, the keyboard cover may detachably be attached onto the rear surface of the housing. In operation 15, in the tablet mode of the electronic device, the housing may be rotated to be 360-degree angled with respect to the display device and, then, the keyboard cover may detachably be attached onto the keyboard, preventing the user's touch. In operation 17, in the move mode of the electronic device, the housing may be rotated to be angled to an angle more than 180 degrees and less than 360 degrees with respect to the display device and, then, the keyboard cover may detachably be attached onto the keyboard.

According to various embodiments of the present disclosure, an electronic device comprises a housing, a keyboard disposed on a front surface of the housing, a plurality of first magnets arranged along a periphery of the keyboard, and a keyboard cover including a cover portion to cover the keyboard and a plurality of second magnets arranged along a periphery of the cover portion so that each of the plurality of second magnets corresponds to a respective one of the plurality of first magnets, wherein the keyboard cover may be detachably attached onto the front surface of the housing by attractive force between the plurality of first magnets and the plurality of second magnets.

According to various embodiments of the present disclosure, the electronic device may further comprise a plurality of mounting units arranged on an inner surface of the housing to at least partially surround the plurality of first magnets.

According to various embodiments of the present disclosure, the electronic device may further comprise an attaching member to attach the plurality of first magnets to the mounting units.

According to various embodiments of the present disclosure, the keyboard cover may provide a receiving hole to receive the plurality of second magnets.

According to various embodiments of the present disclosure, at least one of the plurality of first magnets may have a first polarity in a first direction, and each of the plurality of second magnets may be disposed on a rear surface of the keyboard cover to create attractive force with each of the plurality of first magnets so that a second polarity opposite to the first polarity is directed in a second direction opposite to the first direction.

According to various embodiments of the present disclosure, the plurality of first magnets may include first magnets having the first polarity in the first direction and first magnets having the first direction in the second direction, and the first magnets with the first polarity and the first magnets with the second polarity may be alternately arranged along the periphery of the keyboard.

According to various embodiments of the present disclosure, the plurality of second magnets may be arranged on the rear surface of the keyboard cover so that a polarity different from the polarity of the plurality of first magnets is directed in the second direction, each of the plurality of second magnets may create attractive force with each of the plurality of first magnets in a position corresponding to each of the plurality of first magnets, and upon escaping off the position corresponding to each of the plurality of first magnets, each of the plurality of second magnets may create repulsion against the plurality of first magnets to lead the keyboard cover to a corresponding position on the keyboard.

According to various embodiments of the present disclosure, a guide unit may be provided on a rear surface of the keyboard cover between keys of the keyboard, and the guide unit may fasten the keyboard cover in tight contact to the keyboard while reinforcing rigidity of the keyboard cover.

According to various embodiments of the present disclosure, the front surface of the housing may be positioned coplanar with a front surface of the keyboard cover, with the keyboard cover covering the keyboard.

According to various embodiments of the present disclosure, a second surface of the housing may be positioned on a different plane from the first surface, and a difference in height between the first surface and the second surface may correspond to a thickness of the keyboard cover.

According to various embodiments of the present disclosure, the housing may include a first hooking part positioned at both ends of the second surface, and the keyboard cover may include a second hooking part stuck to the first hooking part while contacting the second surface.

According to various embodiments of the present disclosure, the keyboard cover may be detachably attached onto the housing by attractive force between the plurality of first magnets and the plurality of second magnets to be retained.

According to various embodiments of the present disclosure, a hole may be formed in a rear surface of the housing to at least partially receive the keyboard cover.

According to various embodiments of the present disclosure, the electronic device may further comprise an electronic part received in the housing and driven using a magnet and a shielding member disposed between the electronic part and the first magnets and shielding a magnetic force from the first magnets from flowing to the electronic part.

According to various embodiments of the present disclosure, the shielding member may at least partially surround the first magnets.

According to various embodiments of the present disclosure, the electronic device may further comprise a display device rotatably coupled with the housing. As the housing is rotated by 360 degrees with respect to the display device, the keyboard may face away from the screen of the display device, and the keyboard cover may cover the keyboard, preventing an external force from being applied to the keyboard.

According to various embodiments of the present disclosure, a method for operating an electronic device may comprise rotating a housing to be 0-degree angled with respect to a display device and then detachably attaching a keyboard cover onto a rear surface of the housing to be retained when the electronic device is not used, rotating the housing to be angled to an angle more than 0 degrees and less than 180 degrees with respect to the display device and then detachably attaching the keyboard cover onto the rear surface of the housing in a typing mode of the electronic device, rotating the housing to be 360-degree angled with respect to the display device and then detachably attaching the keyboard cover onto the keyboard in a tablet mode of the electronic device to prevent a user's touch, and rotating the housing to be angled to an angle more than 180 degrees and less than 360 degrees with respect to the display device and then detachably attaching the keyboard cover onto the keyboard in a move mode of the electronic device, wherein the rear surface of the housing is rendered to face a rear surface of the display device by a relative rotation, and the keyboard cover covers the keyboard to prevent an external force from being exerted to the keyboard.

While the present disclosure has been shown and described with reference to exemplary embodiments thereof, it will be apparent to those of ordinary skill in the art that various changes in form and detail may be made thereto without departing from the spirit and scope of the present disclosure as defined by the following claims.

The invention claimed is:

1. An electronic device, comprising:
a housing;
a keyboard disposed on a front surface of the housing;
a plurality of first magnets arranged along a periphery of the keyboard; and
a keyboard cover including a cover portion to cover the keyboard and a plurality of second magnets arranged along a periphery of the cover portion so that each of the plurality of second magnets corresponds to a respective one of the plurality of first magnets,
wherein the keyboard cover is detachably attached onto the front surface of the housing by attractive force between the plurality of first magnets and the plurality of second magnets, and
wherein a hole is formed in a rear surface of the housing to at least partially receive the keyboard cover, and
wherein at least one of the plurality of first magnets has a first polarity in a first direction, and wherein each of the plurality of second magnets is disposed on a rear surface of the keyboard cover to create attractive force with each of the plurality of first magnets so that a second polarity opposite to the first polarity is directed in a second direction opposite to the first direction, and
wherein the keyboard cover the keyboard cover is detachably attached onto the rear surface of the housing by attractive force between a plurality of first magnets and a plurality of second magnets when the keyboard cover is placed on the hole formed on the rear surface.

2. The electronic device of claim 1, further comprising a plurality of mounting units arranged on an inner surface of the housing to at least partially surround the plurality of first magnets.

3. The electronic device of claim 2, further comprising an attaching member to attach the plurality of first magnets to the mounting units.

4. The electronic device of claim 1, wherein the keyboard cover provides a receiving hole to receive the plurality of second magnets.

5. The electronic device of claim 1, wherein the plurality of first magnets include first magnets having the first polarity in the first direction and first magnets having the second polarity in the second direction, and wherein the first magnets with the first polarity and the first magnets with the second polarity are alternately arranged along the periphery of the keyboard.

6. The electronic device of claim 5, wherein the plurality of second magnets are arranged on the rear surface of the keyboard cover so that a polarity different from the polarity of the plurality of first magnets is directed in the second direction, wherein each of the plurality of second magnets creates attractive force with each of the plurality of first magnets in a position corresponding to each of the plurality of first magnets, and wherein upon escaping off the position corresponding to each of the plurality of first magnets, each of the plurality of second magnets creates repulsion against the plurality of first magnets to lead the keyboard cover to a corresponding position on the keyboard.

7. The electronic device of claim 1, wherein a guide unit is provided on a rear surface of the keyboard cover between keys of the keyboard, and wherein the guide unit fastens the keyboard cover in tight contact to the keyboard while reinforcing rigidity of the keyboard cover.

8. The electronic device of claim 1, wherein the front surface of the housing is positioned coplanar with a front surface of the keyboard cover, with the keyboard cover covering the keyboard.

9. The electronic device of claim 8, wherein a second surface of the housing is positioned on a different plane from the first surface, and a difference in height between the first surface and the second surface corresponds to a thickness of the keyboard cover.

10. The electronic device of claim 9, wherein the housing includes a first hooking part positioned at both ends of the second surface, and the keyboard cover includes a second hooking part stuck to the first hooking part while contacting the second surface.

11. The electronic device of claim 1, wherein the keyboard cover is detachably attached onto a rear surface of the housing by attractive force between the plurality of first magnets and the plurality of second magnets to be retained.

12. The electronic device of claim 1, further comprising:
an electronic part received in the housing and driven using a magnet; and
a shielding member disposed between the electronic part and the first magnets and shielding a magnetic force from the first magnets from flowing to the electronic part.

13. The electronic device of claim 12, wherein the shielding member at least partially surrounds the first magnets.

* * * * *